United States Patent
Sing et al.

(10) Patent No.: US 12,031,046 B2
(45) Date of Patent: Jul. 9, 2024

(54) POLYPROPYLENE POLYMERS FOR POWDER BED FUSION BASED ADDITIVE MANUFACTURING

(71) Applicant: BRASKEM AMERICA, INC., Philadelphia, PA (US)

(72) Inventors: Michelle K. Sing, Pittsburgh, PA (US); Hadi Mohammadi, Pittsburgh, PA (US); Moises Magalhaes Werlang, Pittsburgh, PA (US); Ana Paula de Azeredo, Pittsburgh, PA (US); Jacob Fallon, Pittsburgh, PA (US); Kevin Herrington, Pittsburgh, PA (US); Collin Azinger, Pittsburgh, PA (US)

(73) Assignee: BRASKEM AMERICA, INC., Philadelphia, PA (US)

( * ) Notice: Subject to any disclaimer, the term of this patent is extended or adjusted under 35 U.S.C. 154(b) by 0 days.

(21) Appl. No.: 17/870,325

(22) Filed: Jul. 21, 2022

(65) Prior Publication Data
US 2023/0038023 A1 Feb. 9, 2023

Related U.S. Application Data

(60) Provisional application No. 63/224,683, filed on Jul. 22, 2021.

(51) Int. Cl.
| | | |
|---|---|---|
| *B33Y 70/00* | (2020.01) | |
| *B29C 64/153* | (2017.01) | |
| *B33Y 10/00* | (2015.01) | |
| *C09D 11/037* | (2014.01) | |
| *C09D 11/108* | (2014.01) | |
| *B29K 23/00* | (2006.01) | |
| *B29K 105/00* | (2006.01) | |

(52) U.S. Cl.
CPC .......... *C09D 11/108* (2013.01); *B29C 64/153* (2017.08); *B33Y 10/00* (2014.12); *B33Y 70/00* (2014.12); *C09D 11/037* (2013.01); *B29K 2023/14* (2013.01); *B29K 2105/0032* (2013.01)

(58) Field of Classification Search
None
See application file for complete search history.

(56) References Cited

U.S. PATENT DOCUMENTS

| | | |
|---|---|---|
| 5,648,450 A | 7/1997 | Dickens, Jr. et al. |
| 7,722,802 B2 | 5/2010 | Pfeifer et al. |
| 10,280,299 B2 | 5/2019 | Ganapathiappan et al. |
| 2005/0059757 A1 | 3/2005 | Bredt et al. |
| 2011/0293918 A1 | 12/2011 | Lucas et al. |
| 2016/0184891 A1 | 6/2016 | Mironets |
| 2017/0028632 A1 | 2/2017 | Cox et al. |
| 2017/0239889 A1 | 8/2017 | Ganapathiappan et al. |
| 2018/0244862 A1 | 8/2018 | Price |
| 2018/0273707 A1* | 9/2018 | Price ..................... B29C 43/003 |
| 2018/0371244 A1 | 12/2018 | Leenders et al. |
| 2019/0039289 A1 | 2/2019 | Owens et al. |
| 2020/0332103 A1* | 10/2020 | Clark ..................... B29C 64/118 |
| 2021/0163676 A1* | 6/2021 | Balasubramanian ........ B01J 31/2278 |

FOREIGN PATENT DOCUMENTS

| | | |
|---|---|---|
| CN | 103709737 A | 9/2014 |
| EP | 1272334 B1 | 11/2012 |
| EP | 1668071 B1 | 12/2016 |
| WO | 2005090056 A1 | 9/2005 |
| WO | 2017040893 A1 | 3/2017 |
| WO | 2017062031 A1 | 4/2017 |
| WO | 2018148359 A1 | 8/2018 |
| WO | 2019096806 A1 | 5/2019 |
| WO | WO-2019-092498 A1 * | 5/2019 |
| WO | 2020132425 A1 | 6/2020 |
| WO | WO-2020-132425 A1 * | 6/2020 |

OTHER PUBLICATIONS

Bellehumeur et al., "An Experimental Study and Model Assessment of Polymer Sintering," Polymer Engineering and Science, vol. 36, No. 17, (Sep. 1996), pp. 2198-2207.
Vasquez et al., "A targeted material selection process for polymers in laser sintering," Additive Manufacturing 1-4, (Oct. 8, 2014), pp. 127-138.

* cited by examiner

*Primary Examiner* — Mohammad M Ameen
(74) *Attorney, Agent, or Firm* — Jeffrey N. Townes; Cozen O'Connor

(57) ABSTRACT

The invention relates to a sinterable polymer composition, comprising: a random copolymer of propylene and an olefinic comonomer, containing about 2 to 10 wt % olefinic comonomer content, relative to 100 wt % of the random copolymer. The sinterable polymer composition may also contain at least one of a clarifier and a nucleator, and/or at least one additive selected from the group consisting of a primary antioxidant, a secondary antioxidant, an acid scavenger, a peroxide, an enhanced IR energy absorber, a long-term heat agent, and a polyolefin elastomer. The sinterable polymer composition has a melt flow rate from about 1 to 150 g/10 min (230° C./2.16 kg), measured according to ASTM D 1238; a crystallization temperature, Tc, from about 105 to 150° C.; and a xylene solubles content, XS, from about 3% to 40%.

29 Claims, 2 Drawing Sheets

POLYPROPYLENE POLYMERS FOR POWDER BED FUSION BASED ADDITIVE MANUFACTURING

PRIORITY CLAIM

This application claims the benefit of priority to U.S. Provisional Patent Application No. 63/224,683, filed on Jul. 22, 2021, which is herein incorporated by reference in its entirety.

FIELD OF THE INVENTION

This invention generally relates to a sinterable polymer composition comprising a polypropylene random copolymer as an additive feedstock for powder bed fusion based 3D printing.

BACKGROUND OF THE INVENTION

Powder bed fusion based additive manufacturing processes have employed particulate thermoplastic polymer compositions for the manufacture of three-dimensional objects by formation of multiple fused layers. In powder bed fusing, thermal energy selectively fuses regions of a powder bed. For instance, selective laser sintering (SLS) is a powder bed fusion process using one or more lasers to fuse powdered thermoplastic polymers into the desired three-dimensional shape.

Typical particulate thermoplastic polymer materials used in powder bed fusion based process are polyamides such as nylons, and the material properties for nylons suitable for powder bed fusion based processes have been well studied. However, other thermoplastic polymer materials such as polypropylene-based polymers are not well studied for powder bed fusion based 3D printing.

There thus remains a need in the art to develop polypropylene-based polymer materials with desirable structural and material properties that would be suitable for additive feedstock in powder bed fusion based 3D printing, and that would provide improved mechanical properties such as impact resistance and toughness to the printed articles.

SUMMARY OF THE INVENTION

One aspect of the invention relates to a sinterable polymer composition, comprising: a random copolymer of propylene and an olefinic comonomer, wherein the olefinic comonomer of the random copolymer is present in the random copolymer in an amount of from 2 to 10 wt %, relative to 100 wt % of the random copolymer. The sinterable polymer composition may also contain at least one of a clarifier and a nucleator. The sinterable polymer composition may also contain at least one of a primary antioxidant, a secondary antioxidant, an acid scavenger, a peroxide, an enhanced IR energy absorber, a long-term heat agent, and a polyolefin elastomer. The sinterable polymer composition has a melt flow rate from 1 to 150 g/10 min (230° C./2.16 kg), measured according to ASTM D 1238; a crystallization temperature, Tc, from 105 to 150° C.; and a xylene solubles content, XS, from 3% to 40%, measured according to ASTM D5492-17.

Another aspect of the invention relates to an additive-manufacture feedstock in a form of powders that comprise the sinterable polymer composition as described from the above aspect of the invention.

Another aspect of the invention relates to a distribution (e.g., suspension) of pellets or powders, each pellet or powder formed from the additive-manufacture feedstock containing the sinterable polymer composition as described from the above aspect of the invention.

Another aspect of the invention relates to a method of three-dimensional printing or additive manufacturing. The method comprises: (1) depositing a layer of the additive-manufacture feedstock containing the sinterable polymer composition as described from the above aspect of the invention to a printing apparatus; (2) irradiating the sinterable polymer composition at a temperature range that sinters the sinterable polymer composition and causes at least a portion of the sinterable polymer composition to fuse and form a first printing layer; (3) repeating steps (1) and (2) to form a second printing layer on the first printing layer; and (4) optionally forming at least one further printing layer on said second printing layer.

Additional aspects, advantages and features of the invention are set forth in this specification, and in part will become apparent to those skilled in the art on examination of the following, or may be learned by practice of the invention. The inventions disclosed in this application are not limited to any particular set of or combination of aspects, advantages and features. It is contemplated that various combinations of the stated aspects, advantages and features make up the inventions disclosed in this application.

DETAILED DESCRIPTION OF THE INVENTION

Figure 1:
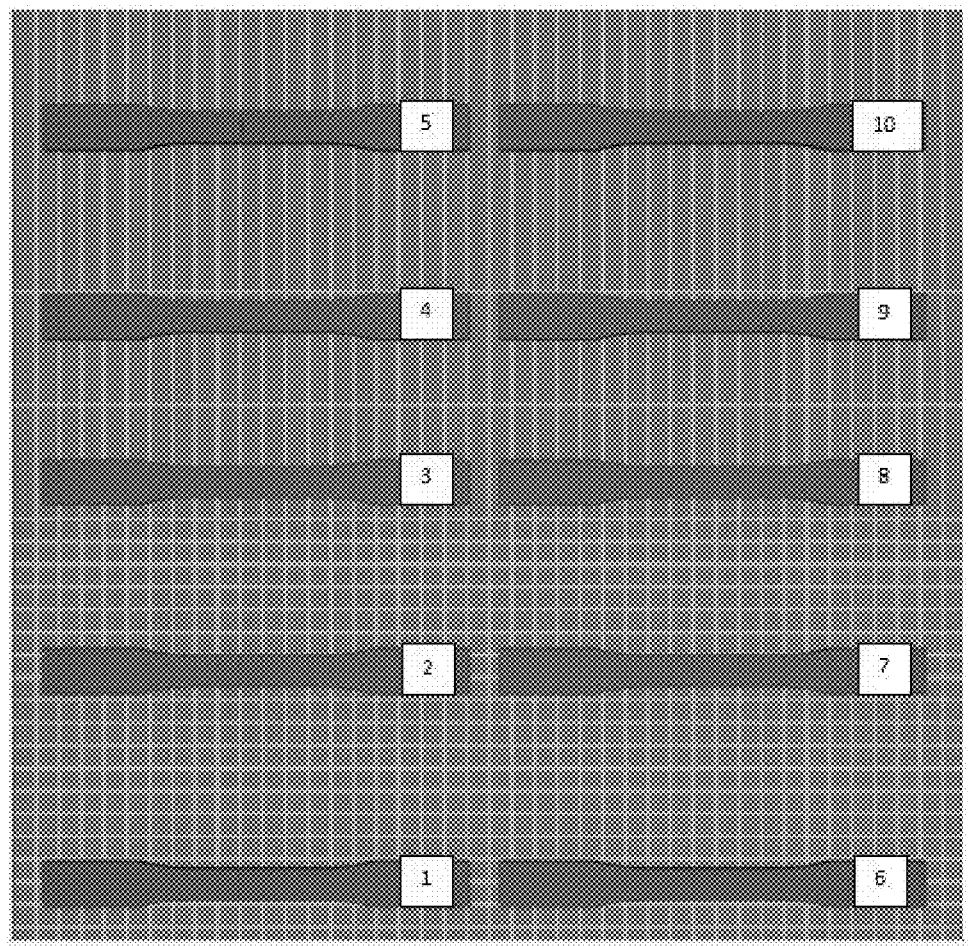
FIG. 1 shows the build layout of printed articles for the Mechanical Property Uniformity Test in the EOS P450.

The disclosure provides a sinterable polymer composition for an additive-manufacture feedstock comprising a random copolymer of propylene and an olefinic comonomer (e.g., a propylene-ethylene random copolymer or propylene-butylene random copolymer) that balances the olefinic comonomer content, the melt flow rate, the crystallization temperature, the melting temperature, the xylene solubles content, and other structural features of the random copolymer, such as the blockiness of the olefinic comonomer insertion, to produce a feedstock material that has good mechanical properties (such as tensile strength, impact resistance, and toughness) suitable for powder bed fusion based 3D printing. Specific additive components were also selected for the sinterable polymer composition to contribute to an improved thermal stability, good flow properties when the additive feedstock is in powder form, and more uniform mechanical properties when being distributed on the powder bed for printing.

Sinterable Polymer Compositions for Additive-Manufacture Feedstock

One aspect of the invention relates to a sinterable polymer composition, comprising: a random copolymer of propylene and an olefinic comonomer, wherein the olefinic comonomer of the random copolymer is present in the random copolymer in an amount of from 2 to 10 wt %, relative to 100 wt % of the random copolymer. The sinterable polymer composition may also contain at least one of a clarifier and a nucleator. The sinterable polymer composition may also contain at least one of a primary antioxidant, a secondary antioxidant, an acid scavenger, a peroxide, an enhanced IR energy absorber, a long-term heat agent, and a polyolefin elastomer. The sinterable polymer composition has a melt flow rate from 1 to 150 g/10 min (230° C./2.16 kg), measured according to ASTM D 1238; a crystallization temperature, Tc, from 105 to 150° C.; and a xylene solubles content, XS, from 3% to 40%, measured according to ASTM D5492-17.

The sinterable polymer composition described herein may be used as an additive manufacture feedstock material suitable for powder bed fusion based 3D printing. The polymer composition is "sinterable," which means that the feedstock material (e.g., in powder or pellet form) in the printed shape will form a coherent mass upon applying one or more external energy sources and/or binders where the feedstock material may or may not undergo melting.

In the sinterable polymer composition, the polypropylene random copolymer constitutes a primary component and can be present up to 100 wt % of the sinterable polymer composition. The polypropylene random copolymer comprises reacted units of propylene and an olefinic comonomer, and may be prepared by polymerizing propylene with one or more olefinic comonomers.

For the production of propylene random copolymers, propylene is typically copolymerized with an olefinic comonomer in a slurry or gas phase polymerization reaction in the presence of a suitable catalyst, such as a non-phthalate Ziegler-Natta catalyst system, following the known polymerization processes.

Suitable olefinic comonomers for polymerization with propylene include, but are not limited to, linear, branched, or cyclic olefins having 2 to 20 carbon atoms, such as an α-olefin and a monomer having at least two double bonds. Exemplary α-olefins are linear, branched, or cyclic α-olefins having 2 to 20 carbon atoms, 2 to 16 carbon atoms, or 2 to 12 carbon atoms, including but not limited to ethylene, 1-butene, 1-pentene, 3-methyl-1-butene, 1-hexene, 4-methyl-1-pentene, 3-methyl-1-pentene, 1-heptene, 4-methyl-1-hexene, 5-methyl-1-hexene, 4,6-dimethyl-1-heptene, 1-octene, 1-nonene, 1-decene, 1-undecene, 1-dodecene, 1-tetradecene, 1-hexadecene, 1-octadecene, 1-eicocene, vinylcyclohexane, styrene, tetracyclododecene, norbornene, 5-ethylidene-2-norbornene (ENB), and combinations thereof. Ethylene and styrene may be considered α-olefins herein. In one embodiment, the olefinic comonomer is ethylene, 1-butene, or a mixture thereof.

Exemplary olefinic comonomers having at least two double bonds are dienes or trienes comonomers, including but not limited to, butadiene (e.g., 1,3-butadiene); pentadiene (e.g., 1,3-pentadiene; 1,4-pentadiene; 3-methyl-1,4-pentadiene; 3,3-dimethyl-1,4-pentadiene); hexadienes (e.g., 1,3-hexadiene; 1,4-hexadiene; 1,5-hexadiene; 4-methyl-1,4-hexadiene; 5-methyl-1,4-hexadiene; 3-methyl-1,5-hexadiene; 3,4-dimethyl-1,5-hexadiene); heptadienes (e.g., 1,3-heptadiene; 1,4-heptadiene; 1,5-heptadiene; 1,6-heptadiene; 6-methyl-1,5-heptadiene); octadienes (e.g., 1,3-octadiene; 1,4-octadiene; 1,5-octadiene; 1,6-octadiene; 1,7-octadiene; 7-methyl-1,6-octadiene; 3,7-dimethyl-1,6-octadiene; 5,7-dimethyl-1,6-octadiene); nonadienes (e.g., 1,8-nonadiene); decadienes (e.g., 1,9-decadiene); undecadienes (e.g., 1,10-undecadiene); dicyclopentadienes; octatrienes (e.g., 3,7,11-trimethyl-1,6,10 octatriene); and combinations thereof.

The polypropylene random copolymer includes a major proportion of propylene and a minor proportion of an olefinic comonomer or a mixture of two or more olefinic comonomers. The mixture of two or more olefinic comonomers can be a mechanical blend or an in-situ blend.

The polypropylene random copolymer may contain from about 2 wt % to about 10 wt % units derived from the olefinic comonomer, relative to 100 wt % of the random copolymer, including all integer ranges there between. For example, the olefinic comonomer content can range from about 2 wt % to about 7.5 wt %, from about 2 wt % to about 5 wt %, or from about 2.5 wt % to about 3 wt %, relative to 100 wt % of the random copolymer.

In certain embodiments, the olefinic comonomer in the polypropylene random copolymer comprises ethylene, butene, or mixtures thereof. The olefinic comonomer content in the random copolymer may contain from about 0.1 wt % to about 50 wt % of ethylene, from about 0.1 wt % to about 50 wt % of butene, or from about 0.1 wt % to about 50 wt % of ethylene and butene.

The polypropylene random copolymer may contain from about 90 wt % to about 98 wt % units derived from propylene, relative to 100 wt % of the random copolymer, including all integer ranges there between. For example, the propylene content can range from about 92.5 wt % to about 98 wt %, from about 95 wt % to about 98 wt %, or from about 97 wt % to about 97.5 wt %, relative to 100 wt % of the random copolymer.

If the propylene unit is in an amount of less than 90 wt %, the copolymer may have a low crystallinity that it may form a rubber-like material, lacking enough chemical resistance and mechanical strength. If, on the other hand, the propylene unit exceeds 98 wt %, the copolymer may contain too much crystalline portion, which may result in a lower degree of sintering and thus a decrease in mechanical properties of the printed articles, such as toughness, tensile, and elongation break.

The term "polypropylene random copolymer" or "propylene random copolymer" herein refers to a polypropylene polymer where the other olefinic comonomer unit(s) present in a random or statistical distribution (i.e. the other olefinic comonomer unit(s) do not form blocks) within the polypropylene blocks which essentially make up the polymer chain.

In certain embodiments, single units of the olefinic comonomer (e.g., single units of ethylene comonomer) are incorporated (inserted) randomly in the polypropylene random copolymer. The polypropylene random copolymer may comprise singly-incorporated units of the olefinic comonomer (e.g., single units of ethylene comonomer) in an amount of from about 0.5 wt % to about 10 wt %, from about 1.5 wt % to about 5 wt %, from about 2.5 wt % to about 3.5 wt %, from about 2.7 wt % to about 3.5 wt %, or from about 2.7 wt % to about 3.2 wt %, relative to 100 wt % of the random copolymer.

In certain embodiments, double units of the olefinic comonomer (e.g., double units of ethylene comonomer) are incorporated (inserted) randomly in the polypropylene random copolymer. This means the olefinic comonomers are incorporated (inserted) as two contiguous repeating units into the polypropylene polymer chain. The polypropylene random copolymer may comprise doubly-incorporated units of the olefinic comonomer (e.g., double units of ethylene comonomer) in an amount of from about 0.01 mol % to about 10 mol %, from about 0.1 mol % to about 5 mol %, from about 0.3 mol % to about 1.0 mol %, from about 0.4 mol % to about 1.0 mol %, from about 0.5 mol % to about 1.0 mol %, from about 0.5 mol % to about 0.9 mol %, or from about 0.6 mol % to about 0.8 mol %, relative to 100 mol % of the random copolymer.

In certain embodiments, triple units of the olefinic comonomer (e.g., triple units of ethylene comonomer) are incorporated randomly in the polypropylene random copolymer. This means the olefinic comonomers are incorporated (inserted) as three contiguous repeating units into the polypropylene polymer chain. The polypropylene random copolymer may comprise triply-incorporated units of the olefinic comonomer (e.g., triple units of ethylene comonomer) in an amount of from about 0.001 mol % to about 10 mol %, from about 0.005 mol % to about 3 mol %, from about 0.01 mol % to about 0.5 mol %, from about 0.1 mol % to about 0.5 mol %, from about 0.15 mol % to about 0.5 mol %, from about 0.2 mol % to about 0.4 mol %, or from about 0.2 mol % to about 0.35 mol %, relative to 100 mol % of the random copolymer.

The blockiness of the olefinic comonomer insertion (e.g., ethylene insertion) into the polypropylene polymer chain can be measured and determined by $^{13}C$ NMR spectroscopy in accordance with Kakugo et al., *Macromolecules* 15, 1150-1152, 1982, which is incorporated herein by reference in its entirety.

The sinterable polymer composition may further comprise a polymer disperse phase, and the polypropylene random copolymer serves as a matrix phase (or continuous phase) in which the polymer disperse phase is dispersed.

The polymer disperse phase in the sinterable polymer composition may be present in an amount of from about 1 wt % to about 40 wt %, from about 1 wt % to about 35 wt %, from about 1 wt % to about 30 wt %, from about 1 wt % to about 20 wt %, from about 1 wt % to about 10 wt %, from about 2 wt % to about 10 wt %, or from about 2 wt % to about 5 wt %, relative to 100 wt % of sinterable polymer composition. The amount of the polymer disperse phase in the sinterable polymer composition can have an impact on the processability performance of the sinterable polymer composition serving as the additive-manufacture feedstock. If the amount of the polymer disperse phase is too high, the sinterable polymer composition may have a low crystallinity that it may form a rubber-like material, lacking enough chemical resistance and mechanical strength.

In some embodiments, the polymer disperse phase comprises an olefin-based elastomer. Suitable olefins include all those α-olefins described above relating to the olefinic comonomers for polymerizing with propylene for forming polypropylene random copolymers. For instance, the polymer disperse phase may comprise an elastomer derived from an ethylene, a $C_4$-$C_{10}$ α-olefin, or combinations thereof, wherein the content of the ethylene, $C_4$-$C_{10}$ α-olefin, or combinations thereof may be at up to about 100 wt %, up to about 99 wt %, up to about 95 wt %, up to about 90 wt %, up to about 85 wt %, up to about 80 wt %, from about 1 wt % to 80 wt %, from about 1 wt % to about 50 wt %, from about 5 wt % to about 50 wt %, from about 5 wt % to about 20 wt %, or from about 8 wt % to about 20 wt %, relative to 100 wt % of the polymer disperse phase.

In one embodiment, the polymer disperse phase comprises an ethylene-based polymer, having an ethylene content of up to about 99 wt %, up to about 95 wt %, up to about 90 wt %, up to about 85 wt %, up to about 80 wt %, from about 1 wt % to 80 wt %, from about 1 wt % to about 50 wt %, from about 5 wt % to about 50 wt %, from about 5 wt % to about 20 wt %, or from about 8 wt % to about 20 wt %, relative to 100 wt % of the polymer disperse phase. For instance, the polymer disperse phase may be a propylene ethylene copolymer.

The polypropylene random copolymer of the sinterable polymer composition may have a melt flow rate of from about 1 g/10 min to about 150 g/10 min, from about 1 g/10 min to about 100 g/10 min, from about 2 g/10 min to about 100 g/10 min, from about 5 to about 100 g/10 min, from about 8 to about 100, or from about 5 g/10 min to about 50 g/10 min. The melt flow rate is measured at 230° C. with a 2.16 kg melt indexer weight, in accordance with ASTM D 1238.

The sinterable polymer composition may have a peak crystallization temperature, Tc, ranging from about 105° C. to about 150° C., from about 105° C. to about 125° C., from about 112° C. to about 122° C., or from about 115° C. to about 122° C. Peak crystallization temperature, Tc, is a key governing parameter defining performance and dimensional stability of the sintered part. Polymer compositions with a higher peak crystallization temperature, Tc, exhibit thicker crystals which lead to better mechanical performance (higher modulus, yield stress, etc. . . . ) and more uniform crystal structures that result in higher dimensional stability. The peak crystallization temperature can be measured by differential scanning calorimetry (DSC).

In certain embodiments, the sinterable polymer composition has a melting temperature at least about 10° C. higher, about 15° C. higher, about 20° C., about 25° C., or about 30° C. higher than the peak crystallization temperature, Tc, of sinterable polymer composition. For instance, the sinterable polymer composition may have a melting temperature, Tm, ranging from about 125° C. to about 175° C., from about 130° C. to about 155° C., or from about 135° C. to about 155° C. The melting temperatures can be measured by differential scanning calorimetry (DSC).

In powder bed fusion, the additive-manufacture feedstock is generally held at a temperature between the crystallization temperature and melt temperature. The additive-manufacture feedstock is held above the crystallization temperature to minimize warping, and the processing temperature is typically as close to the melting temperature as is possible without actually melting the feedstock.

Thus, the higher the difference between the melting temperature and crystallization temperature is, the broader the processing window for powder bed fusion for a good sintering.

In certain embodiments, the sinterable polymer composition may be treated by heat to narrow the melting curve and increase the melting temperature of the sinterable composition. Increasing the melting temperature of the sinterable polymer composition is desirable as it can further increase the difference between the melting temperature and crystallization temperature, thus broadening the processing window for powder bed fusion for a good sintering. Suitable heat treatment methods include those described in U.S. Pat. No. 9,580,551, which is incorporated herein by reference in its entirety.

In certain embodiments, the sinterable polymer composition has a xylene solubles content, XS, of from about 3 to about 40%, from about 3% to about 30%, from about 3% to about 15%, from about 3% to about 11%, from about 3% to about 10%, from about 5% to about 10%, or from about 6% to about 10%, measured according to ASTM D5492-17. Xylene soluble contents may be measured using a flow injection polymer analysis unit.

In certain embodiments, the polypropylene random copolymer of the sinterable polymer composition has a weight-average molecular weight, Mw, from about 100,000 g/mol to about 500,000 g/mol, from about 150,000 g/mol to about 500,000 g/mol, or from about 150,000 g/mol to about 300,000 g/mol.

In certain embodiments, the polypropylene random copolymer of the sinterable polymer composition has a number-average molecular weight, Mn, from about 15,000 g/mol to about 100,000 g/mol, from about 20,000 g/mol to about 50,000 g/mol, or from about 20,000 g/mol to about 35,000 g/mol.

In certain embodiments, the polypropylene random copolymer of the sinterable polymer composition has a z-average molecular weight, Mz, from about 200,000 g/mol to about 1500,000 g/mol, from about 200,000 g/mol to about 1000,000 g/mol, or from about 400,000 g/mol to about 900,000 g/mol.

In certain embodiments, the sinterable polymer composition has a dispersity (Đ) calculated by Mw/Mn, ranging from about 6 to about 15, from about 7 to about 12, or from 7 to about 11.

The various molecular weights (number average molecular weight $M_n$, weight average molecular weight $M_w$, and z-average molecular weight Mz) and dispersity of the polypropylene random copolymer discussed above may be measured by GPC or GPC-IR.

When in the printed article form, the sinterable polymer composition in the additive-manufacture feedstock has an average elongation-at-break of at least about 8%, at least about 12%, at least about 15%, at least about 20%, at least about 25%, at least about 30%, at least about 35%, or at least about 50%. The tensile tests such as the elongation-at-break may be measured according to ASTM D 638, at a tensile rate at 2 in/min, 1 in/min, or 0.2 in/min.

In some embodiments, the sinterable polymer composition comprises a propylene-ethylene random copolymer having one or more features/properties as follows:
i) an ethylene content ranging from about 2 wt % to about 7.5 wt % (or from about 2 wt % to about 5 wt %, or from about 2.5 wt % to about 3 wt %), relative to 100 wt % of the random copolymer;
ii) a melt flow rate ranging from about 2 g/10 min to about 100 g/10 min (or from about 8 to about 100, or from about 5 g/10 min to about 50 g/10 min), measured according to ASTM D 1238 (230° C./2.16 kg);
iii) a crystallization temperature, Tc, ranging from about 105° C. to about 125° C. (or from about 112° C. to about 122° C., or from about 115° C. to about 122° C.), measured by differential scanning calorimetry;
iv) a melting temperature, Tm, ranging from about 130° C. to about 155° C. (or from about 135° C. to about 155° C., or from about 135° C. to about 150° C.), measured by differential scanning calorimetry;
v) a xylene solubles content, XS, ranging from about 3% to 15% (or from about 3% to about 11%, or from about 6% to about 10%), measured according to ASTM D5492-17; and/or
vi) a dispersity (Đ) calculated by Mw/Mn, ranging from about 6 to about 15 (or from about 7 to about 12, or from 7 to about 11), measured by GPC or GPC-IR.

In some embodiments, the sinterable polymer composition comprises a propylene-ethylene random copolymer having two or more of the above i)-vi) features/properties, three or more of the above i)-vi) features, four or more of the above i)-vi) features/properties, five or more of the above i)-vi) features/properties, or all the above i)-vi) features/properties.

The sinterable polymer composition may further comprise one or more additives that can be blended or compounded with the sinterable polymer composition.

In some embodiments, the additive-manufacture feedstock comprises at least about 51 wt % (at least about 60 wt %, at least about 70 wt %, at least about 80 wt %, at least about 90 wt %, at least about 95 wt %, at least about 98%, at least about 99 wt %, or at least about 99.5 wt %) of the sinterable polymer composition, and no more than about 49 wt % (no more than about 40 wt %, no more than about 30 wt %, no more than about 20 wt %, no more than about 10 wt %, no more than about 5 wt %, no more than about 2%, no more than about 1 wt %, or no more than about 0.5 wt %) of the additive, relative to 100% of the additive manufacture feedstock.

The sinterable polymer composition may contain a clarifier and/or a nucleator. A nucleator or clarifier can provide nucleation, promote crystallization of the polymer, control the rate, size, degree, and isotropy of crystallization, and improve clarity to polymer compositions. Suitable nucleators/clarifiers include, but are not limited to, a dicarboxylate metal salt, a sorbitol derivative, a trisamide, a phosphate ester salt, and mixtures thereof.

Exemplary dicarboxylate metal salts include Hyperform® HPN-68L (bicyclo[2.2.1]heptane dicarboxylate salt), and Hyperform® HPN-20E (a dicarboxylate calcium metal salt), which are commercially available via Milliken & Company.

Exemplary sorbitol derivatives include Millad 3905 (1,2,3,4-dibenzylidene sorbitol), Millad 3940 (1,2,3,4-di-para-methylbenzylidene sorbitol), Millad 3988 (1,2,3,4-di-meta, para-methylbenzylidene sorbitol), and Millad NX8000 (1,2,3-trideoxy-4,5:5,7-bis-O-[(4-propylphenyl)methylene]-Nonitol), all of which are commercially available via Milliken & Company.

Exemplary trisamides include trisamide benzene compounds, such as Irgaclear® XT386 (N,N',N"-benzene-1,3,5-triyltris(2,2-dimethylpropanamide)), and RiKaclear® PC1 (N,N',N"-Tris (2-methylcyclohexyl)-1,2,3-propanetricarboxamide.

Exemplary phosphate ester salts include NA-11 (sodium 2,2'-methylene-bis-(4,6-di-tert-butylphenyl) phosphate), NA-21 (aluminum hydroxybis[2,4,8,10-tetrakis(1,1-dimethylethyl)-6-hydroxy-12H-dibenzo[d,g][1,3,2]dioxaphoshocin 6-oxidato]), NA-71, NA-806A, NA-27, and NA-902, all of which are commercially available via Amfine Chemical Corporation.

Additional suitable nucleators/clarifiers may be found in U.S. Patent Application Publication No. 2020/0079943, U.S. Patent Application Publication No. 2020/0277480, and U.S. Pat. No. 7,659,336, which are incorporated herein by reference in their entirety.

The amounts of nucleators or clarifiers added to the sinterable polymer composition to form an additive manufacture feedstock may range from about 0.01 wt % to about 5 wt %, from about 0.01 wt % to about 1 wt %, from about 0.01 wt % to about 0.5 wt %, from about 0.01 wt % to about 0.1 wt %, from about 0.02 wt % to about 0.5 wt %, from about 0.03 wt % to about 0.25 wt %, from about 0.04 wt % to about 0.25 wt %, from about 0.05 wt % to about 0.25 wt %, from about 0.05 wt % to about 0.2 wt %, or from about 0.05 wt % to about 0.15 wt %, relative to 100% of the additive manufacture feedstock.

The sinterable polymer composition may also contain one or more of antioxidants (primary antioxidants, secondary antioxidants), acid scavengers, peroxides, enhanced IR energy absorbers, long-term heat agents, polyolefin elastomers, and combinations thereof. The amounts of each of the antioxidants, acid scavengers, peroxides, enhanced IR energy absorbers, long-term heat agents, and polyolefin elastomers added to the sinterable polymer composition to form an additive manufacture feedstock may range from about 0.01 wt % to about 40 wt %, from about 0.01 wt % to about 30 wt %, from about 0.01 wt % to about 10 wt %, from about 0.01 wt % to about 5 wt %, from about 0.01 wt % to about 1 wt %, from about 0.01 wt % to about 0.1 wt %, from about 0.02 wt % to about 0.5 wt %, from about 0.03 wt % to about 0.25 wt %, from about 0.04 wt % to about 0.25 wt %, from about 0.05 wt % to about 0.25 wt %, from about 0.05 wt % to about 0.2 wt %, or from about 0.05 wt % to about 0.15 wt %, relative to 100% of the additive manufacture feedstock.

Antioxidants (e.g., a primary antioxidant or a secondary antioxidant) can provide additional stability to the sinterable polymer composition and protect against polymer degradation during processing.

Suitable primary antioxidants include, but are not limited to, hindered phenolic-based antioxidants. Exemplary phenolic-based antioxidants are AO-1010 (tetrakis [methylene-3-(3,5-di-tert-butyl-4-hydroxyphenyl-propionate)] methane), AO-264 (2,6-di-t-butyl-4-methylphenol), and AO-1076 (octadecyl-3-[3,5-di-tert-butyl-4-hydroxyphenyl] propionate]), Dovemox 3114 (tris(3,5-di-t-butyl-4-hydroxybenzyl)-1,3,5-triazine-2,4,6(1H, 3H, 5H)-trione), and α-tocopherol (Vitamin E).

Suitable secondary antioxidants include, but are not limited to, phosphite-based antioxidants. Exemplary phosphite-antioxidants are triphenyl phosphite, diphenylalkyl phosphites, phenyldialkyl phosphites, tris(nonylphenyl)phosphite, trilauryl phosphite, trioctadecyl phosphite, distearyl pentaerythritol diphosphite, tris(2,4-di-tert-butylphenyl)phosphite, diisodecyl pentaerythritol diphosphite, bis(2,4-di-tert-butylphenyl)pentaerythritol diphosphate, tristearyl sorbitol triphosphite, tetrakis(2,4-di-tertbutylphenyl)-4,4'-biphenylene diphosphonate, AO-168 (tris-(2.4-di-t-butylphenyl)-phosphite), Doverphos® S-9228 (bis (2,4-dicumylphenyl) pentaerythritol diphosphate), Doverphos® LGP-11 (phosphorous acid, triphenyl ester, polymer with α-hydro-ω-hydroxypoly[oxy(methyl-1,2-ethanediyl)], C10-16 alkyl esters) and Irganox® HP-136 (5,7-bis(1,1-dimethylethyl)-3-[2,3 (or 3,4)-dimethylphenyl]-2(3H)-benzofuranone).

Acid scavengers can irreversibly absorb acidic catalytic residues and promote stability of the polymer composition. Suitable acid scavengers include, but are not limited to, hydrotalcites (e.g., DHT), calcium stearate, zinc stearate, a bivalent metal co-salt of lactic acid and a fatty acid (e.g., Pationic 930, Pationic 940, Pationic 1230, Pationic 1240, and Pationic 1250, all of which are commercially available via the American Ingredients Company.

Peroxides provide control to the molecular weight and melt flow rate of the sinterable polymer composition. Suitable peroxides include, but are not limited to dialkyl type peroxides and peroxyketal type peroxides. Exemplary peroxides are Luperox®, peroxide 101 (Trigonox 101, 2,5-dimethyl-2,5-di(tert-butylperoxy) hexane), Luperox DTA (di-tertiary-amylperoxide), Trigonox 201, Trigonox 301, Lupersol® 233, and Lupersol® 533.

Long-term heat agents/stabilizers can provide additional thermostability to the sinterable polymer composition. Exemplary long-term heat agents/stabilizers are thioester-based antioxidants such as DSTDP (distearyl thiodipropionate), DLTDP or DLTP (dilauryl thiodipropionate), DMTDP (dimyristyl thiodipropionate), dioctadecyl disulfide, Songnox 4120 (pentaerythrityl tetrakis(3-laurylthiopropionate).

Enhanced IR energy absorbers can improve the uptake of laser energy for the sinterable polymer compositions. The enhanced IR energy absorber comprises at least one of carbon black, graphene, alumina, calcium carbonate, and mixtures thereof. An exemplary enhanced IR energy absorber is ColorMatrix™ Joule (Avient). Additional suitable energy absorbers may be found in U.S. Pat. Publication Nos. 7,820,781 B2; 4,476,272; 7,776,942; 8,039,577; and 8,039,577; International Application Publication No. WO 2004/083294; and Japanese Publication JP 5986208B2; all of which are incorporated herein by reference in their entirety.

Polyolefin elastomers can improve impact toughness and overall mechanical properties of the sinterable polymer composition. Suitable polyolefin elastomers include but are not limited to ethylene-butene random copolymers (e.g., Tafmer DF), propylene-butene random copolymers (e.g., Tafmer XN), ethylene-octane rubber (e.g., ENGAGE 8200), styrene-butadiene copolymers (e.g., KRATON), ethylene-propylene rubber/elastomer (e.g., Vistamaxx), impact modifiers, and mixtures thereof.

The sinterable polymer composition may further comprise one or more other additives, such as a filler (e.g., a property-improvement filler); a laser attractive ink; and a colorant, dye, or pigment.

Suitable property-improvement fillers include, but are not limited to, flame retardants (e.g., a brominated compound, phosphate, or red phosphorus), glass spheres or microspheres, and fibers (such as natural fibers, carbon fibers, glass fibers, metal fibers, ceramic fibers, aramid fibers, organic fibers, or a combination thereof).

Other inorganic fillers include, but are not limited to, talc; marble dust; cement dust; rice husks (e.g., including silica ash by burning rice husks); clay; feldspar; silica or fumed silica, silicate, calcium silicate, silicic acid powder, or mica; metal, metal oxide, or metal salt particles and nanoparticles (such as magnesium oxide, antimony oxide, zinc oxide, barium sulfate, wollastonite, alumina, aluminum silicate, titanium oxide, or calcium carbonate); a polyhedral oligomeric silsesquioxane; and combinations thereof.

Suitable laser attractive inks include ink-additive formulations containing near-infrared dyes or ink-additive formulations that are suitable for use in an inkjet print head, such as those described in U.S. Patent Application Publication Nos. 2017/0239889 and 2017/0355137, which are incorporated herein by reference in their entirety.

Other non-limiting examples of additional additives that may be added to the sinterable polymer composition for additive-manufacture feedback include a sliding agent; an adhesion promoter; a biocide (e.g., an antibacterial, fungicide, or mildewcide); a whitening agent; an anti-static agent; an anti-blocking agent; a processing aid; a bonding, blowing and foaming agent; a plasticizer (e.g., phthalates and phosphate); a heat stabilizer (e.g., a phenol heat stabilizer or acrylate heat stabilizer); a UV absorber (e.g., a benzotriazole-based UV absorber, benzophenone-based UV absorber, or salicylate-based UV absorber); a light stabilizer (e.g., an organic nickel-based light stabilizer or hindered amine-based light stabilizer); a dispersant; a lubricant; and combinations thereof.

Additive-Manufacture Feedstock

Certain aspects of the invention relate to an additive manufacture feedstock comprising the sinterable polymer composition as described in the above aspect relating to the sinterable polymer composition, and a method for selecting/tailoring a polypropylene copolymer as a sinterable polymer composition suitable for powder bed fusion based 3D printing.

The additive manufacture feedstock described herein to be supplied for 3D printing can be in various forms or shapes, such as powder or pellets, or a distribution of powders or pellets (e.g., suspensions, such as in a slurry/paste/clay or solid mixture form).

All above descriptions and all embodiments discussed in the above aspect relating to the sinterable polymer composition, including various components, features, and properties of the polypropylene random copolymer; various additives; and the amounts used thereof are applicable to these aspects of the invention relating to an additive manufacture feedstock and a method for selecting/tailoring a polypropylene copolymer as a sinterable polymer composition suitable for powder bed fusion based 3D printing.

Some embodiments of the invention relate to an additive manufacture feedstock in a form of powders that comprise the sinterable polymer composition as described above.

The quality of the printed articles depends on the properties of the sinterable polymer composition as well as the properties of the powders. For instance, the broader the processing window (difference between the crystallization temperature and melting temperature) and the sharper the onset of the melting peak of the polypropylene random copolymer, the easier it is to obtain a good processing temperature. Quality packing of the powders is also partially a function of the properties of the sinterable polymer composition. Once the polymer composition starts to sinter/melt, the powder can become harder to spread.

The density of the sintered part depends on how well the powders flow and pack in the powder bed. Accordingly, desirable shape of the powders is a balance between a shape that spreads well (e.g., spheres) and a shape that packs well (e.g., cylinders). Typically, the individual powder particle is ellipsoidal in shape, having a sphericity of from about 0.5 to about 1. The particle size distribution of the powders, defined by d50, ranges from about 25 to about 150 µm. Typically, the powders have a particle size distribution, defined by d50, ranging from about 40 to about 100 µm, for instance, from about 40 to about 80 µm, or from about 40 to about 50 µm. This allows for a better flow of the powders, and also allows for a printing layer height of 100 to 200 µm and a finer part resolution, when printing with powder bed fusion.

The flow properties of the sinterable polymer composition and the resulting powders contribute to the degree and quality of sintering that the additive feedstock would undergo during powder bed fusion printing, as well as to the resolution of the final printed article. If the powder feedstock flows too much, the resolution of the final printed article may be significantly reduced. If the powder feedstock does not flow enough, the final printed article may not have enough mechanical strength or may not sinter at all.

Some embodiments of the invention relate to a distribution (e.g., suspension) of pellets or powders, each pellet or powder formed from the additive-manufacture feedstock containing the sinterable polymer composition as described above. For instance, the additive-manufacture feedstock material may be extruded into pellets.

The distribution (e.g., suspension) of the additive-manufacture feedstock containing the sinterable polymer composition may exist as suspensions of powders or pellets, e.g., in a slurry/paste/clay form, or in a solid mixture form. The distribution (e.g., suspension) of pellets or powders can be supplied to a 3D printer for printing. The distribution (e.g., suspension) of pellets or powders may have a count of 5 to 60 pellets per gram of the distribution, for instance, a count of 5 to 20 pellets per gram of the distribution, or a count of 30 to 60 pellets per gram of the distribution.

When forming the pellets by extrusion, the additive-manufacture feedstock may be extruded by means known in the art using an extruder or other vessel apparatus. The term "extruder" takes on its broadest meaning and, includes any machine suitable for the polypropylene polymer extrusion. For instance, the term includes machines that can extrude the additive-manufacture feedstock in the form of powder or pellets, rods, strands, fibers or filaments, sheets, or other desired shapes and/or profiles. Generally, an extruder operates by feeding the feedstock material through the feed throat (an opening near the rear of the barrel) which comes into contact with one or more screws. The rotating screw(s) forces the feedstock material forward into one or more heated barrels (e.g., there may be one screw per barrel). In many processes, a heating profile can be set for the barrel in which three or more independent proportional-integral-derivative controller (PID)-controlled heater zones can gradually increase the temperature of the barrel from the rear (where the plastic enters) to the front.

The vessel can be, for instance, a single-screw or a twin-screw extruder, or a batch mixer. Further descriptions about extruders and processes for extrusion can be found in U.S. Pat. Nos. 4,814,135; 4,857,600; 5,076,988; and 5,153,382; all of which are incorporated herein by reference.

When a melt extrusion is used, the temperature and conditions for extruding the additive-manufacture feedstock may be different according to the type of the polypropylene random copolymer.

A wide variety of powder production methods known to one skilled in the art for producing polypropylene powders are suitable herein for forming the powders. For instance, various milling methods may be used, e.g., a cryogenic milling that utilizes a cryogenic grinder. The grinding apparatus may be a jet or an impact mill with a series of sieves used to separate out the desired particle sizes and recycle large particles back through the grinder. Additional methods for forming powders can be found in U.S. Pat. No. 10,343,303, U.S. Patent Application Publication No. 2018/0022024, and Japanese patent 2006-257117, all of which are incorporated herein by reference.

The method described herein selects the components for the additive-manufacture feedstock by balancing the olefinic comonomer content, the melt flow rate, the crystallization temperature, the melting temperature, the xylene solubles contents, and other structural features of the polypropylene random copolymer, such as the blockiness of the olefinic comonomer insertion, to produce a sinterable polymer composition that would provide good mechanical properties (such as tensile strength, impact resistance, and toughness) suitable for feedstock material use in powder bed fusion based 3D printing. Specific additive components are also selected for the sinterable polymer composition to contribute to an improved thermal stability, good flow properties when the additive feedstock is in powder form, and more uniform mechanical properties when being distributed on the powder bed for printing.

3D Printing Using the Additive-Manufacture Feedstock

Another aspect of the invention relates to a method of three-dimensional printing or additive manufacturing. The method comprises: (1) depositing a layer of the additive-manufacture feedstock containing the sinterable polymer composition as described from the above aspect of the invention to a printing apparatus; (2) irradiating the sinterable polymer composition at a temperature range that sinters the sinterable polymer composition and causes at least a portion of the sinterable polymer composition to fuse and form a first printing layer; (3) repeating steps (1) and (2) to form a second printing layer on the first printing layer; and (4) optionally forming at least one further printing layer on said second printing layer. As used herein, the word "irradiating" includes the use of a light emitted from a laser, an IR lamp, LED lights, and any light source suitable for use in sintering techniques for 3D printing.

Another aspect of the invention relates to a method of three-dimensional printing or additive manufacturing. The method comprises coalescing the sinterable polymer composition as described from the above aspect of the invention. The coalescing can occur by heating particles of the sinterable polymer composition, or by impacting particles of the sinterable polymer composition against a build plate in a technique known as cold spray additive manufacturing.

Certain aspects of the invention also relate to an article formed from the sinterable polymer composition described above. The article may be formed by powder bed function based three-dimensional printing or additive manufacturing, as described below.

All above descriptions and all embodiments discussed in the above aspect relating to the sinterable polymer composition, including various components, features, and properties of the polypropylene random copolymer; various additives; and the amounts used thereof are applicable to these aspects of the invention relating to a method of three-dimensional printing or additive manufacturing and relating to an article formed from the sinterable polymer composition.

Additionally, all above descriptions and all embodiments discussed in the above aspects relating to the additive-manufacture feedstock and the method for selecting/tailoring a polypropylene copolymer as a sinterable polymer composition suitable for powder bed fusion based 3D printing are also applicable to these aspects of the invention relating to a method of three-dimensional printing or additive manufacturing and relating to an article formed from the sinterable polymer composition.

The method herein employs powder bed function based 3D printing technology. In powder bed function based 3D printing technology, the additive-manufacture feedstock (e.g., powders or pellets containing the sinterable polymer composition) is sintered and fused together using an external energy source or binder. Sections of the additive-manufacture feedstock can be selectively fused together using an energy source, a low-viscosity adhesive, or a combination of a low-viscosity ink and an energy source that preferentially targets areas containing the ink. These technologies may be sensitive to the flow properties of the sintering medium, the amount of energy absorbed, the kinetics of crystallization relative to chain diffusion, and the size and shape of the initial additive-manufacture feedstock material.

In a typical powder bed fusion based printing process, the 3D printer fills its chamber with an inert gas and then heats it to the printing temperature, which may be a range between the crystallization temperature and melting temperature of the sinterable polymer composition. A thin layer of additive-manufacture feedstock (e.g., powders of the sinterable polymer composition) is then applied to the build platform of the printing apparatus, according to a pre-determined layer thickness. An energy source (e.g., a fiber optic laser, at 200/400 W; a $CO_2$ laser, at 20-200 W; or a LED array) is applied to the cross-section of the additive-manufacture feedstock to irradiate the sinterable polymer composition, causing at least a portion of the sinterable polymer composition to fuse together and form a first printing layer. When the layer is finished, the platform moves down, allowing another layer of additive-manufacture feedstock to be added. The process is repeated until the final article is obtained.

The printing temperature is typically above the crystallization temperature of the sinterable polymer composition to minimize warping of the printed article. The printing temperature may be as close to the melting temperature of the sinterable polymer composition as is possible without actually melting the additive-manufacture feedstock material. This is done to minimize the difference in temperature between the sintered material and the powder bed (as a high differential can cause the printed part to curl) as well as to minimize the amount of energy required for printing.

The printing apparatus (i.e., the 3D printer) can employ various 3D printing technologies known in the art broadly as powder bed fusion (PBF). In some embodiments, the printing apparatus employs an agent and energy for fusion, e.g., a multi jet fusion (MJF) method or high speed sintering (HSS) method. In some embodiments, the printing apparatus employs an energy source that is based on thermal fusion, e.g., selective heat sintering (SHS). In some embodiments, the printing apparatus employs an energy source that is based on laser fusion, such as selective laser sintering (SLS), selective laser melting (SLM) method, or direct metal laser sintering (DMLS) method. In some embodiments, the printing apparatus employs an agent for fusion, e.g., a binder jetting (BJ) method. In some embodiments, the printing apparatus employs an energy source that is based on electron beam fusion, such as electron beam melting (EBM) method. Some of these technologies, such as SLM, DMLS, BJ, and EBM, are typically used for metal and/or ceramic parts. However, when appropriate binders/additives are used in the sinterable polymer composition, these technologies can be suitable to print the sinterable polymer composition described herein.

In another embodiment, the printing apparatus (i.e., the 3D printer) can be one useful in the cold spray additive manufacturing technique, wherein the polymer particles can be accelerated at a substrate, and the particles can be fused together by the energy imparted on them at impact with the substrate. In one embodiment, the additive-manufacture feedstock material of the present invention can have a d50 of from about 1 to about 10 microns.

The additive-manufacture feedstock may be supplied to the printing apparatus in various forms or shapes, such as powder or pellets, or a distribution (e.g., suspensions, such as in a slurry/paste/clay or solid mixture form) of powders or pellets, as discussed above.

The article formed from the sinterable polymer composition, as described above, by the powder bed function based three-dimensional printing or additive manufacturing, can have improved mechanical properties, toughness, tensile, and elongation break. For instance, the printed article can have an average elongation-at-break of at least about 8%, at least about 12%, at least about 15%, at least about 20%, at least about 25%, at least about 30%, at least about 35%, or at least about 50%. The tensile tests such as the elongation-at-break may be measured according to ASTM D 638, at a tensile rate at 2 in/min, 1 in/min, or 0.2 in/min.

EXAMPLES

The following examples are for illustrative purposes only and are not intended to limit, in any way, the scope of the present invention.

Example 1—Additive-Manufacture Feedstock by Sinterable Polymer Compositions Containing Propylene/Ethylene Random Copolymers Polypropylene Random Copolymer Compositions Exemplary sinterable polymer compositions for additive manufacture feedstock used in the examples were various polypropylene random copolymers produced by polymerizing propylene and ethylene using a Ziegler Natta catalyst.

The series of exemplary polypropylene random copolymers (labeled in the tables as RCP-1, RCP-2, RCP-3, RCP-4, and RCP-5) were polypropylene random copolymers prepared with varying the ethylene contents, melt flow rates, crystallization temperature, xylene solubles, dispersity, and other properties. The various properties of the sinterable compositions containing the exemplary polypropylene random copolymers are listed in Tables 2-4.

Comparative Examples

The polymer samples in Comparative Examples A (labeled in the tables as HCHP-1, HCHP-2, HCHP-3, HP-1, HP-2, HP-3, and HP-4) were Braskem polypropylene homopolymers in commercial grades with varying the melt flow rates, crystallization temperature, xylene solubles, dispersity, and other properties.

The various properties of the sinterable polymer compositions containing the exemplary polypropylene random copolymers (RCP-1, RCP-2, RCP-3, RCP-4, and RCP-5) compared against those of the polypropylene homopolymers in Comparative Examples A are listed in Table 2. As shown in Table 2, the printed articles printed from the powders produced from each of the exemplary polypropylene random copolymers show improved mechanical properties (e.g., a much higher average extension-at-break, which measures the fracture strain) when compared to those of the printed articles printed from the powders produced from the polypropylene homopolymers in Comparative Examples A.

The polymer samples in Comparative Examples B (labeled in the tables as ICP-1, ICP-2, ICP-3, ICP-4, and ICP-5) were Braskem polypropylene-based heterophasic copolymers in commercial grades with varying the melt flow rates, crystallization temperature, xylene solubles, dispersity, and other properties.

The various properties of the sinterable polymer compositions containing the exemplary polypropylene random copolymers (RCP-1, RCP-2, RCP-3, RCP-4, and RCP-5) were compared against those polypropylene-based heterophasic copolymers in Comparative Examples B and listed in Table 3. As shown in Table 3, the printed articles printed from the powders produced from each of the exemplary polypropylene random copolymers show improved mechanical properties (e.g., much higher average extension-at-break, which measures the fracture strain) when compared to those of the printed articles printed from the powders produced from the polypropylene-based heterophasic copolymers in Comparative Examples B.

The polymer samples in Comparative Example C (labeled in the tables as TERPO-1) were Braskem polypropylene-based terpolymer in commercial grade with the melt flow rate, crystallization temperature, xylene solubles, dispersity, and other properties listed in Table 3. As shown in Table 3, the printed articles printed from the powders produced from each of the exemplary polypropylene random copolymers show improved mechanical properties (e.g., much higher average Young's Modulus, which measures the tensile stiffness) when compared to those of the printed article printed from the powder produced from the polypropylene-based terpolymer in Comparative Example C.

The samples in Comparative Examples D were commercially available polypropylene powders: LehVoss PP (by Lehman & Voss, Luvosint 65-8824), EOS PP1101 (by EOS, PP1101), and Ricoh PP (by Ricoh, PP 55500P).

The various properties of the sinterable polymer compositions containing the exemplary polypropylene random copolymers (RCP-1, RCP-2, RCP-3, RCP-4, and RCP-5) were compared against those commercially available polypropylene powders in Comparative Examples D and listed in Table 4. As shown in Table 4, four of the exemplary polypropylene random copolymers (RCP-1, RCP-2, RCP-4, and RCP-5) have a crystallization temperature of above 115° C., whereas the four commercial available polypropylene powders have a crystallization temperature no more than 110.6° C. Moreover, the xylene solubles content for the exemplary polypropylene random copolymers all fell within 6-9%, whereas the four commercial available polypropylene powders have either a significantly lower xylene solubles content of 2.1% or below, or a significantly higher xylene solubles content of 12.5%.

Additive Variations

To evaluate the benefit of additive components in the sinterable polymer composition, various additives were added to a base resin. The base resin is an exemplary Braskem polypropylene random copolymer (labeled in the tables as RCP-6) in commercial grade.

The polymer samples containing various additive components added to the base resin are shown in Table 1. The following additives were used in the examples:
Nucleator
Clarifier
Primary Antioxidant, a high molecular weight hindered sterically phenolic antioxidant
Secondary antioxidant, a hydrolytically stable phosphite antioxidant
Acid Scavenger 1
Acid Scavenger 2
Peroxide to adjust melt flow to a desired level (e.g., 7.0-8.5), here Peroxide 101
Long term heat stabilizer, a thioester antioxidant

TABLE 1

Polypropylene random copolymer samples with various additive components

| Sample | | Reactor Powder* | Nucleator/ Clarifier | Primary Antioxidant | Secondary Antioxidant | Acid Scavenger | Peroxide** | Long term heat agent |
|---|---|---|---|---|---|---|---|---|
| Base | Name | Reactor Powder | N/A | Primary Antioxidant | Secondary Antioxidant | Acid Scavenger 1 | Peroxide 101 | N/A |
| Resin | ppm | N/A | — | 800 | 800 | 300 | | — |
| RCP-6 | w % | 99.81 | 0 | 0.08 | 0.08 | 0.03 | | 0 |
| RCP-6 -AS | Name | Reactor Powder | N/A | Primary Antioxidant | Secondary Antioxidant | Acid Scavenger 2 | Peroxide 101 | N/A |
| | ppm | N/A | — | 800 | 800 | 1000 | | — |
| | wt % | 99.74 | 0 | 0.08 | 0.08 | 0.1 | | 0 |
| RCP-6 -N2 | Name | Reactor Powder | Clarifier | Primary Antioxidant | Secondary Antioxidant | Acid Scavenger 1 | Peroxide 101 | N/A |
| | ppm | N/A | 2000 | 800 | 800 | 300 | | — |
| | wt % | 99.61 | 0.2 | 0.08 | 0.08 | 0.03 | | 0 |

TABLE 1-continued

Polypropylene random copolymer samples with various additive components

| Sample | | Reactor Powder* | Nucleator/ Clarifier | Primary Antioxidant | Secondary Antioxidant | Acid Scavenger | Peroxide** | Long term heat agent |
|---|---|---|---|---|---|---|---|---|
| RCP-6 -TS | Name | Reactor Powder | N/A | Primary Antioxidant | Secondary Antioxidant | Acid Scavenger 2 | Peroxide 101 | Long term heat stabilizer |
| | ppm | N/A | — | 1250 | 2500 | 1000 | | 2000 |
| | wt % | 99.325 | 0 | 0.125 | 0.25 | 0.1 | | 0.2 |
| RCP-6 -TSN1 | Name | Reactor Powder | Nucleator | Primary Antioxidant | Secondary Antioxidant | Acid Scavenger 2 | Peroxide 101 | Long term heat stabilizer |
| | ppm | N/A | 400 | 1250 | 2500 | 1000 | | 2000 |
| | wt % | 99.285 | 0.04 | 0.125 | 0.25 | 0.1 | | 0.2 |
| RCP-6 -TSN2 | Name | Reactor Powder | Clarifier | Primary Antioxidant | Secondary Antioxidant | Acid Scavenger 2 | Peroxide 101 | Long term heat stabilizer |
| | ppm | N/A | 2000 | 1250 | 2500 | 1000 | | 2000 |
| | wt % | 99.125 | 0.2 | 0.125 | 0.25 | 0.1 | | 0.2 |

*Reactor powder is the powder from the reactor used as the base for the formulation of the sinterable polymer composition.
**The amount of peroxide was adjusted to obtain the desired melt flow rate and would depend on the ratios of other components in the polymer system. Therefore, it was not included in ppm amounts or wt % calculations as it was consumed during processing.

The properties of the sinterable polymer compositions containing an exemplary polypropylene random copolymer (the base resin RCP-6) combined with various additive components (as shown in Table 1) are listed in Table 5.

Measuring Methods for Structural Properties of the Polymer Samples

Melt flow rate (MFR) measurements. The melt flow rates of the polymer samples were measured at 230° C. with a 2.16 kg melt indexer weight in accordance with the ASTM D 1238 standard.

Differential scanning calorimetry (DSC) measurements. The crystallization behaviors of the polymer samples were measured by using DSC on a TA Instruments DSC Q2000, according to ASTM D 3418-12. The peak crystallization temperature (TO, the crystallization onset temperature ($T_{oc}$), various melting temperatures ($T_{m1}$, $T_{m2}$, and/or $T_{m3}$), and the degree of crystallinity ($X_c$) of the polymer samples were determined based on the DSC measurements. The degree of crystallinity was determined using the enthalpy of fusion based on the resultant crystallization exotherm and the heat of fusion of a 100% crystalline polypropylene value of 207 J/g per Blaine, R. L. published at TA Instruments's website at http://www.tainstruments.com/pdf/literature/TN048.pdf; see also Gaur et al., *J. Phys. Chem. Ref. Data*, 10 (4), 1981; both of which are incorporated herein by reference in their entirety Thermogravimetric Analysis (TGA). TGA was performed using thermal analysis on a Mettler Toledo TGA 2 with a heating ramp of 10° C./min under air flow (60 mL/min) from room temperature to 500° C. The onset temperatures of degradation for the polymer samples were determined based on the TGA measurements.

Xylene Solubles (XS) Measurements: The xylene solubles percentages were measured using the conditions prescribed in ASTM D5492-17 using a flow injection polymer analysis unit.

Fourier transform infrared (FTIR): FTIR spectra of the polymer samples were recorded on a Nicolet 6700 spectrophotometer from 4000 to 400 $cm^{-1}$. The ethylene content in the polymer samples was determined based on the FTIR measurements.

Gel permeation chromatography (GPC)/size exclusion chromatography (SEC) measurements: GPC and SEC measurements were carried out on a GPC-IR® (Polymer Char, Valencia, Spain), which is a high-temperature GPC/SEC instrument with IR detection. Various molecular weights (number average molecular weight $M_n$, weight average molecular weight $M_w$, and z-average molecular weight Mt), and dispersity ($Đ=M_w/M_n$) of the polymer samples were determined by GPC-IR measurements. GPC-IR experiments performed as part of the present invention included the use of GPC-IR5 detector, a 1 mL/min flow rate, a dissolution temperature of 150° C. for 90 minutes, a unit temperature of 150° C., and a viscometer temperature set at 65° C. A precolumn used during the experiments was the Agilent PLgel Olexis Guard 50×7.5 mm, and other columns used during the experiments were the Agilent PLgel Olexis Guard 300×7.5 mm having theoretical plate counts over 15,000. All GPC-IR experiments were performed according to standards ASTM D6474 and ISO 16014-4.

$^{13}C$ nuclear magnetic resonance (NMR): $^{13}C$ NMR of the polymer samples was recorded on a Bruker Avance 500 spectrometers. The solvent was 1,1,2,2-tetrachloroethylene-d2 and samples were tested at 120° C. The ethylene content (E wt %) and the measurement the blockiness of the ethylene insertion (EE mol %: amount of ethylene inserted as two contiguous repeating units; EEE mol %: amount of ethylene inserted as three contiguous repeating units) were determined using $^{13}C$ NMR spectroscopy in accordance with the procedures described in Kakugo et al., *Macromolecules* 15, 1150-1152, 1982, which is incorporated herein by reference in its entirety.

Powder Production

All the polymer samples (except the commercially available polypropylene powder samples that were already in powder form), were melt-blended and compounded in twin-screw extruder with various additive packages to form pellets. The screw speed and melt temperature of the extruder were adjusted according to the base resin in each of the polymer formulations. The polypropylene powders were prepared through a cryogenic impact milling process. Sieving is carried out with a series of sieves to achieve the target particle size. The particle size distribution was measured using a Malvern Instruments Mastersizer.

Powder Bed Fusion Based 3D Printing Tests

The polypropylene powders from each of the polymer samples discussed above were then sintered on a laser prototyping machine (a modified DTM Sinterstation with updated hardware and software). The particles were placed in two adjacent trays on the working surface and heated to above room temperature (the specific temperature varied depending on the thermal properties of the polymer sample). The particles were transferred to the working surface using a roller in 100-150 micron layers. The working surface was heated to a temperature between 120 and 155° C. via overhead heaters. A $CO_2$ laser provided the additional energy required for sintering the particles using a range of laser powers from 15 to 65 W over the desired cross-section.

Once the first layer has been sintered, the working surface was lowered and the roller then deposited a second powder layer on the working surface. The working surface was heated using overhead heaters and the laser provided additional energy for sintering over the desired surface. This process was repeated until the final article was obtained.

Tensile Tests on Printed Parts

The tensile tests were performed on the printed article resulted from the polypropylene powders from each of the polymer samples according to ASTM D638. The tensile rate for the printed article resulting from the polypropylene powder from the Base Resin RCP-6 (listed in Table 1) was at 1 in/min; and the tensile rate for the printed article resulting from the polypropylene powders from all other polymer samples was at 0.2 in/min.

Powder Bed Fusion Based Mechanical Property Uniformity Test

The polypropylene powder formulation variations on RCP-6 included in Table 1 were sintered on a laser prototyping machine, specifically an EOS P450. The particles were placed in a hopper that deposited the particles into a dual roller. The particles were then transferred to the working surface using a roller in 120 micron layers at a recoating speed of 200 mm/s. The working surface was heated to a targeted temperature of 126° C. via overhead heaters. A $CO_2$ laser provided the additional energy required for sintering the particles. The outlines of the printed articles were first exposed to 25 W at a scanning speed of 3000 mm/s. Immediately following the outline, the interior portions of the articles were exposed to 70 W at a speed of 6900 mm/s. Processing conditions were tuned to work for all the samples, without optimization for each individual formulation.

Once the first layer has been sintered, the working surface was lowered and the roller then deposited a second powder layer on the working surface. The working surface was heated using overhead heaters and the laser provided additional energy for sintering over the desired surface. This process was repeated until the final articles were obtained. The final articles for were generated following FIG. 1 to test the uniformity of mechanical properties throughout the bed.

Tensile Tests on Printed Parts

The tensile tests were performed on the printed article resulted from the polypropylene powder formulations on RCP-6 combined with various additive components included in Table 1 according to ASTM D638. The tensile rate for the printed article resulting from the polypropylene powder from RCP-6 N2, RCP-6 AS, RCP-6 TS, and RCP-6 TSN2 (listed in Table 1) was at 2 in/min.

As shown in Table 5, the standard deviations across all 10 printed articles for each tested material indicate the degree of property variation across the bed at the stated processing conditions. As seen by the results presented in Table 5, RCP-6-TSN2 exhibited the lowest standard deviation of the elongation-at-break, showing that RCP-6-TSN2 exhibits the most consistency in its mechanical properties across the parts bed.

Figure 2:
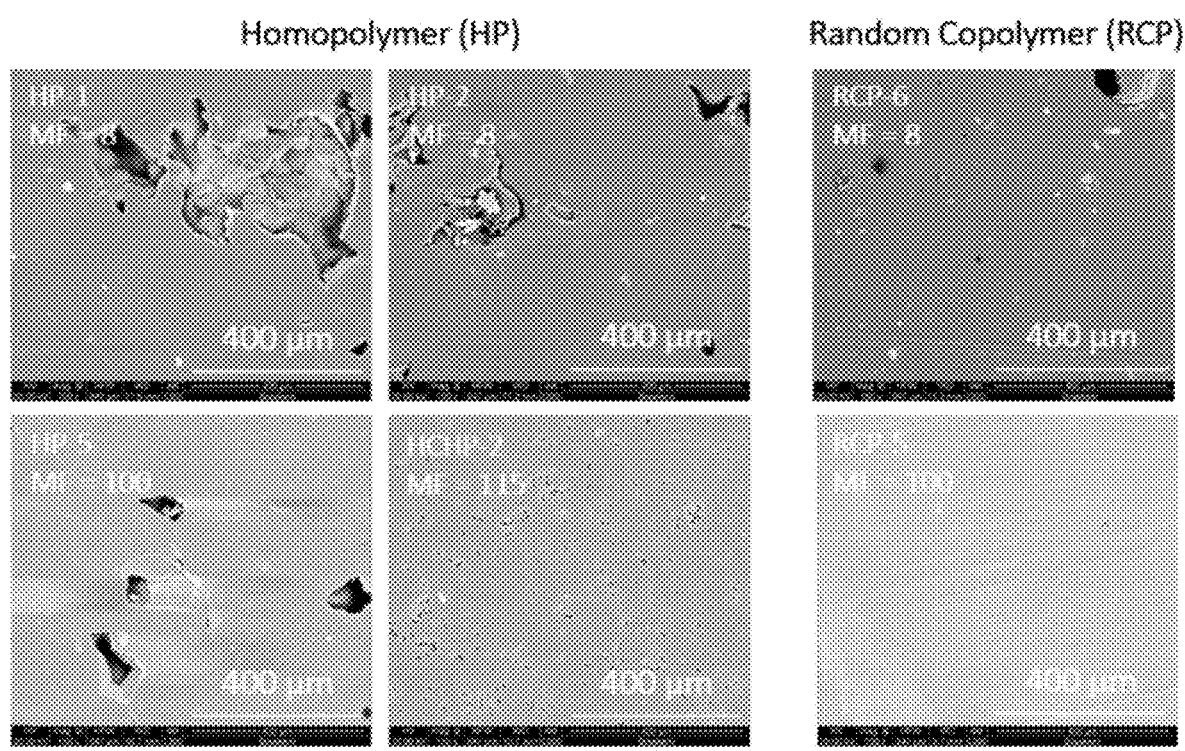
FIG. 2 shows the SEM images of parts printed with homopolymer and random copolymer, respectively.

FIG. 2 shows SEM images of powder bed fusion printed parts: two images for two polypropylene homopolymers with a MFR of 8 g/10 min (labeled as HP-1 and HP-2), an image for a polypropylene homopolymer with a MFR of 100 g/10 min (labeled as HP-5), an image for a high crystalline polypropylene homopolymer with a MFR at 115 g/10 min (labeled as HCHP-2), and two images for two polypropylene random copolymers with a MFR of 8 g/10 min (labeled as RCP-6) and a MFR of 100 g/10 min (labeled as RCP-5), respectively. As seen in these images, the polypropylene random copolymers coalesced into a part, exhibiting better uniformity in the structure of the part, whereas prominent sinter-failure domains are seen in the printed parts made of polypropylene homopolymers. It is believed that the improved uniformity of the random copolymer printed parts is the result of ethylene incorporation as part of the random copolymer structure, which also led to improved tensile strength properties in the printed part.

TABLE 2

Properties for the exemplary polypropylene random copolymers, as compared to the propylene-based homopolymers in Comparative Examples A

| | | Propylene Homopolymer (Comparative Examples A) | | | | | | | |
|---|---|---|---|---|---|---|---|---|---|
| | Sample | HCHP-1 | HCHP-2 | HCHP-3 | HP-1 | HP-2 | HP-3 | HP-4 | HP-5 |
| | Melt Flow (g/10 min) | 8 | 115 | 270 | 8 | 8 | 40 | 45 | 100 |
| | Polymer Type | HCHP | HCHP | HCHP | HP | HP | HP | HP | HP |
| DSC | $T_c$ (° C.) | 132.6 | 132.6 | 133.0 | 112.1 | 113.1 | 118.6 | 135.6 | 113.8 |
| | $X_c$ (%) | 52.6 | 54.3 | 54.5 | 43.8 | 46.7 | 48.1 | 52.7 | 49.1 |
| | $T_{oc}$ (° C.) | 138.0 | 140.0 | 140.0 | 120.0 | 122.0 | 126.0 | 142.8 | 124.8 |
| | Melt Temperature $T_{m1}$ (° C.) | 167.4 | 164.7 | 164.0 | 162.2 | 164.2 | 164.1 | 165.2 | 159.4 |
| | Melt Temperature $T_{m2}$ (° C.) | | | | | | | | |
| | Melt Temperature $T_{m3}$ (° C.) | | | | | | | | |
| TGA | Onset of Degradation (° C.) | 423.6 | 427.0 | 427.4 | 425.9 | 426.0 | 425.9 | 428.2 | 427.3 |
| FIPA Fractionation | Xylene Solubles (%) | 1.4 | 1.6 | 2.4 | 4.7 | 2.4 | 3.0 | 2.5 | 3.1 |
| FTIR | Ethylene Content (wt %) | 0.0 | 0.0 | 0.0 | 0.0 | 0.0 | 0.0 | 0.0 | 0.0 |

TABLE 2-continued

Properties for the exemplary polypropylene random copolymers, as compared to the propylene-based homopolymers in Comparative Examples A

| | | | | | | | | | |
|---|---|---|---|---|---|---|---|---|---|
| GPC-IR | $M_n$ | 29,900 | 17,400 | 12,800 | 45,350 | 36,300 | 29,900 | 23,450 | 24,100 |
| | $M_w$ | 340,200 | 161,950 | 120,100 | 294,500 | 335,650 | 244,200 | 203,400 | 188,200 |
| | Dispersity | 11.4 | 9.3 | 9.4 | 6.6 | 9.3 | 8.2 | 8.7 | 7.8 |
| | $M_z$ | 1,638,700 | 848,500 | 506,900 | 807,700 | 1,162,700 | 609,350 | 575,950 | 443,950 |
| Tensile Tests on Printed Parts | Average Extension at Break (%) | 3.11 | 0.71 | 0.53 | 1.58 | 2.33 | 2.04 | 2.32 | 1.02 |
| | EAB Error (%) | 0.37 | 0.22 | 0.21 | 0.33 | 1.67 | 0.72 | 0.29 | 0.39 |
| Mechanical Properties | Average Young's Modulus (MPa) | 1878.21 | 1816.1 | 2720.45 | 1482.43 | 1326.98 | 1590.01 | 2329.79 | 1608.14 |
| | Modulus Error (MPa) | 169.65 | 411.94 | 237.3 | 288.53 | 312.78 | 218.02 | 142.5 | 355.75 |

| | | | Propylene Random Copolymer | | | | |
|---|---|---|---|---|---|---|---|
| | | Sample | RCP-1 | RCP-2 | RCP-3 | RCP-4 | RCP-5 |
| | | Melt Flow (g/10 min) | 2 | 12 | 40 | 45 | 100 |
| | | Polymer Type | RCP | RCP | RCP | RCP | RCP |
| | DSC | $T_c$ (° C.) | 119.7 | 120.7 | 106.4 | 121.2 | 116.6 |
| | | $X_c$ (%) | 37.6 | 38.8 | 38.3 | 38.8 | 38.5 |
| | | $T_{oc}$ (° C.) | 125.2 | 126.6 | 112.9 | 125.1 | 124.8 |
| | | Melt Temperature $T_{m1}$ (° C.) | 147.9 | 148.5 | 143.5 | 149.8 | 146.1 |
| | | Melt Temperature $T_{m2}$ (° C.) | 136.6 | 137.2 | | 135.5 | 137.8 |
| | | Melt Temperature $T_{m3}$ (° C.) | | | | | |
| | TGA | Onset of Degradation (° C.) | 425.7 | 422.8 | 422.4 | 424.9 | 424.4 |
| | FIPA Fractionation | Xylene Solubles (%) | 6.8 | 6.2 | 6.1 | 6.4 | 7.3 |
| | FTIR | Ethylene Content (wt %) | 2.5 | 2.6 | 2.9 | 3.0 | 3.0 |
| | GPC-IR | $M_n$ | 49,250 | 28,975 | 33,350 | 22,600 | 21,975 |
| | | $M_w$ | 484,700 | 261,050 | 206,100 | 199,250 | 172,500 |
| | | Dispersity | 9.8 | 9.0 | 6.2 | 8.8 | 7.9 |
| | | $M_z$ | 1,389,850 | 751,650 | 461,200 | 580,850 | 484,425 |
| | Tensile Tests on Printed Parts | Average Extension at Break (%) | 35.27 | 15.34 | 12.72 | 16.16 | 8.8 |
| | | EAB Error (%) | 13.13 | 1.08 | 1.95 | 1.89 | 3.05 |
| | Mechanical Properties | Average Young's Modulus (MPa) | 633.04 | 1330.36 | 1118.87 | 899.35 | 875.17 |
| | | Modulus Error (MPa) | 44.52 | 31.28 | 38.03 | 58.32 | 188.78 |

TABLE 3

Properties for the exemplary polypropylene random copolymers, as compared to the propylene-based heterophasic copolymers in Comparative Examples B and the propylene-based terpolymer in Comparative Example C

| | | Propylene-based Heterophasic Copolymer (Comparative Examples B) | | | | | Propylene-based Terpolymer (Comparative Ex. C) |
|---|---|---|---|---|---|---|---|
| | Sample | ICP-1 | ICP-2 | ICP-3 | ICP-4 | ICP-5 | TERPO-1 |
| | Melt Flow (g/10 min) | 35 | 35 | 12 | 20 | 30 | 9 |
| | Polymer Type | 1CP | 1CP | 1CP | 1CP | 1CP | TERPO |
| DSC | $T_c$ (° C.) | 134.7 | 123.9 | 123.8 | 118.2 | 125.3 | 99.2 |
| | $X_c$ (%) | 46.2 | 47.9 | 41.8 | 40.6 | 39.9 | 33.2 |
| | $T_{oc}$ (° C.) | | | | | | 105.4 |
| | Melt Temperature $T_{m1}$ (° C.) | 165.5 | 164.8 | 165.4 | 165.8 | 165.4 | 133.6 |
| | Melt Temperature $T_{m2}$ (° C.) | 72.5 | 92.6 | 64.5 | 65.0 | 63.6 | |
| TGA | Melt Temperature $T_{m3}$ (° C.) | | | | | | |
| | Onset of Degradation (° C.) | 486.1 | 485.4 | 485.5 | 484.1 | 484.2 | 418.6 |
| FIPA | Xylene Solubles (%) | 25.9 | 20.6 | 29.0 | 27.3 | 30.3 | 8.3 |
| FTIR | Ethylene Content (wt %) | 13.0 | 9.6 | 12.3 | 12.3 | 10.0 | 2.2 |
| GPC-IR | $M_n$** | | | | | | 42,750 |
| | $M_w$** | | | | | | 346,100 |
| | Dispersity** | | | | | | 8.1 |
| | $M_z$** | | | | | | 918,750 |
| Tensile Tests on Printed Parts | Average Extension at Break (%) | 2.66 | 1.67 | 6.87 | 4.45 | 2.67 | 80.3 |
| | EAB Error (%) | 0.4 | 0.31 | 1.12 | 1.01 | 0.36 | 80.45 |
| Mechanical Properties* | Average Young's Modulus (MPa) | 1063.53 | 1544.05 | 1036.3 | 1077.58 | 814.86 | 735.02 |
| | Modulus Error (MPa) | 186.4 | 236.58 | 138.13 | 357.21 | 149.54 | 114.14 |

| | | Propylene Random Copolymer | | | | |
|---|---|---|---|---|---|---|
| | Sample | RCP-1 | RCP-2 | RCP-3 | RCP-4 | RCP-5 |
| | Melt Flow (g/10 min) | 2 | 12 | 40 | 45 | 100 |
| | Polymer Type | RCP | RCP | RCP | RCP | RCP |
| DSC | $T_c$ (° C.) | 119.7 | 120.7 | 106.4 | 121.2 | 116.6 |
| | $X_c$ (%) | 37.6 | 38.8 | 38.3 | 38.8 | 38.5 |
| | $T_{oc}$ (° C.) | 125.2 | 126.6 | 112.9 | 125.1 | 124.8 |
| | Melt Temperature $T_{m1}$ (° C.) | 147.9 | 148.5 | 143.5 | 149.8 | 146.1 |
| | Melt Temperature $T_{m2}$ (° C.) | 136.6 | 137.2 | | 135.5 | 137.8 |
| TGA | Melt Temperature $T_{m3}$ (° C.) | | | | | |
| | Onset of Degradation (° C.) | 425.7 | 422.8 | 422.4 | 424.9 | 424.4 |
| FIPA | Xylene Solubles (%) | 6.8 | 6.2 | 6.1 | 6.4 | 7.3 |
| FTIR | Ethylene Content (wt %) | 2.5 | 2.6 | 2.9 | 3.0 | 3.0 |
| GPC-IR | $M_n$** | 49,250 | 28,975 | 33,350 | 22,600 | 21,975 |
| | $M_w$** | 484,700 | 261,050 | 206,100 | 199,250 | 172,500 |
| | Dispersity** | 9.8 | 9.0 | 6.2 | 8.8 | 7.9 |
| | $M_z$** | 1,389,850 | 751,650 | 461,200 | 580,850 | 484,425 |

TABLE 3-continued

Properties for the exemplary polypropylene random copolymers, as compared to the propylene-based heterophasic copolymers in Comparative Examples B and the propylene-based terpolymer in Comparative Example C

| | | | | | | |
|---|---|---|---|---|---|---|
| Tensile Tests on Printed Parts | Average Extension at Break (%) | 35.27 | 15.34 | 12.72 | 16.16 | 8.8 |
| | EAB Error (%) | 13.13 | 1.08 | 1.95 | 1.89 | 3.05 |
| Mechanical Properties* | Average Young's Modulus (MPa) | 633.04 | 1330.36 | 1118.87 | 899.35 | 875.17 |
| | Modulus Error (MPa) | 44.52 | 31.28 | 38.03 | 58.32 | 188.78 |

TABLE 4

Properties for the exemplary polypropylene random copolymers, as compared to commercially available polypropylene powders in Comparative Examples D

| | | Propylene Random Copolymer | | | | |
|---|---|---|---|---|---|---|
| | Sample | RCP-1 | RCP-2 | RCP-3 | RCP-4 | RCP-5 |
| TGA | Melt Flow (g/10 min) | 2 | 12 | 40 | 45 | 100 |
| | Polymer Type | RCP | RCP | RCP | RCP | RCP |
| | $T_c$ (° C.) | 119.7 | 120.7 | 106.4 | 121.2 | 116.6 |
| | $X_c$ (%) | 37.6 | 38.8 | 38.3 | 38.8 | 38.5 |
| | $\Delta H$ (J/g) | | | | | |
| | $T_{oc}$ (° C.) | 125.2 | 126.6 | 112.9 | 125.1 | 124.8 |
| | Melt Temperature $T_{m1}$ (° C.) | 147.9 | 148.5 | 143.5 | 149.8 | 146.1 |
| | Melt Temperature $T_{m2}$ (° C.) | 136.6 | 137.2 | | 135.5 | 137.8 |
| | Melt Temperature $T_{m3}$ (° C.) | | | | | |
| | Onset of Degradation (° C.) | 425.7 | 422.8 | 422.4 | 424.9 | 424.4 |
| FIPA | Xylene Solubles (%) | 6.8 | 6.2 | 6.1 | 6.4 | 7.3 |
| FTIR | Ethylene Content (wt %) | 2.5 | 2.6 | 2.9 | 3.0 | 3.0 |
| GPC-IR | $M_n$ | 49,250 | 28,975 | 33,350 | 22,600 | 21,975 |
| | $M_w$ | 484,700 | 261,050 | 206,100 | 199,250 | 172,500 |
| | Dispersity | 9.84 | 9.025 | 6.175 | 8.82 | 7.855 |
| | $M_z$ | 1,389,850 | 751,650 | 461,200 | 580,850 | 484,425 |
| Tensile Tests on Printed Parts | Average Extension at Break (%) | 35.27 | 15.34 | 12.72 | 16.16 | 8.8 |
| | EAB Error (%) | 13.13 | 1.08 | 1.95 | 1.89 | 3.05 |
| Mechanical Properties | Average Young's Modulus (MPa) | 633.04 | 1330.36 | 1118.87 | 899.35 | 875.17 |
| | Modulus Error (MPa) | 44.52 | 31.28 | 38.03 | 58.32 | 188.78 |

| | | Commercially Available Polypropylene Powders* | | |
|---|---|---|---|---|
| | Sample | LehVoss PP | EOS PP1101 | Ricoh PP |
| TGA | Melt Flow (g/10 min) | | | |
| | Polymer Type | RCP | RCP | PP |
| | $T_c$ (° C.) | 106.4 | 110.6 | |
| | $X_c$ (%) | 34.3 | 38.2 | |
| | $\Delta H$ (J/g) | 70.9 | 79.0 | |
| | $T_{oc}$ (° C.) | 109.7 | 113.8 | |
| | Melt Temperature $T_{m1}$ (° C.) | 143.2 | 139.0 | 125.1 |
| | Melt Temperature $T_{m2}$ (° C.) | | 130.2 | |
| | Melt Temperature $T_{m3}$ (° C.) | | 61.3 | |
| | Onset of Degradation (° C.) | | 419.9 | 437.5 |

TABLE 4-continued

Properties for the exemplary polypropylene random copolymers, as compared to commercially available polypropylene powders in Comparative Examples D

|  |  |  |  |  |  |
|---|---|---|---|---|---|
| FIPA | Xylene Solubles (%) |  | 12.5 | 2.1 | 1.1 |
| FTIR | Ethylene Content (wt %) |  | 2.7 | 1.6 | 3.4 |
| GPC-IR | $M_n$ |  | 27,300 | 35,800 | 72,200 |
|  | $M_w$ |  | 170,100 | 158,875 | 252,850 |
|  | Dispersity |  | 6.235 | 4.45 | 3.575 |
|  | $M_z$ |  | 357,900 | 261,350 | 500,625 |
| Tensile Tests on Printed Parts Mechanical Properties | Average Extension at Break (%) EAB Error (%) Average Young's Modulus (MPa) Modulus Error (MPa) |  |  |  |  |

*Additional technical data for the LehVoss PP, EOS PP1101, and Ricoh PP, can be found in the publicly available technical data sheets, which are incorporated herein by reference.

TABLE 5

Properties of the sinterable polymer composition containing an exemplary polypropylene random copolymer combined with various additives shown in Table 1

| | | | Propylene Random Copolymer (with various additives) | | | | | |
|---|---|---|---|---|---|---|---|---|
| | | Sample | Base Resin RCP-6 | RCP-6 - AS | RCP-6 - N2 | RCP-6 - TS | RCP-6 - TSN1 | RCP-6 - TSN2 |
| | Melt Flow (g/10 min) | | 8 | 8 | 8 | 8 | 8 | 8 |
| | Polymer Type | | RCP | RCP | RCP | RCP | RCP | RCP |
| DSC | Annealed First Melt $T_m$ (° C.) | | 149.87 | 150.38 | 150.01 | 149.1 | 149.97 | 149.89 |
| | Annealed $T_{om}$ (° C.) | | 141.72 | 143.04 | 142.82 | 141.27 | 141.72 | 142.5 |
| | $T_c$ (° C.) | | 105.4 | 103.4 | 117.6 | 103.1 | 116.7 | 117.0 |
| | $X_c$ (%) | | 40.5 | 40.8 | 42.6 | 40.1 | 41.3 | 41.0 |
| | ΔH (J/g) | | | | | | | 84.9 |
| | $T_{oc}$ (° C.) | | 108.8 | 107.0 | 120.7 | 106.7 | 120.1 | 120.3 |
| | Melt Temperature $T_{m1}$ (° C.) | | 141.4 | 141.3 | 145.4 | 141.2 | 145.3 | 145.4 |
| | Melt Temperature $T_{m2}$ (° C.) | | | | 133.0 | | 132.9 | 133.2 |
| | Melt Temperature $T_{m3}$ (° C.) | | | | | | | |
| TGA | Onset of Degradation (° C.) | | 427.5 | 427.5 | 427.5 | 427.5 | 427.5 | 427.5 |
| FIPA | Xylene Solubles (%) | | 7.7 | | | | | 9.3 |
| FTIR | Ethylene Content (wt %) | | 2.9 | 3.0 | 3.0 | 2.8 | 2.8 | 2.8 |
| GPC-IR | $M_n$ | | 34,700 | | | | | 26,950 |
| | $M_w$ | | 300,550 | | | | | 279,150 |
| | Dispersity | | 8.655 | | | | | 10.36 |
| | $M_z$ | | 880,100 | | | | | 803,550 |
| $^{13}$C NMR | E (wt %) | Total | 3.49 | | | | | 3.17 |
| | EE (mol %) | Total | 0.72 | | | | | 0.60 |
| | EEE (mol %) | Total | 0.32 | | | | | 0.27 |
| Tensile Tests on Printed Parts Mechanical Properties | Average Extension at Break (%) EAB Error (%) Average Young's Modulus (MPa) Modulus Error (MPa) | | 49.39 9.11 853.65 51.88 | | | | | |
| Mechanical Property Uniformity Test | Average Extension at Break (%) | | | 35.86 | 32.2 | 44.12 | | 24.02 |
| | EAB Error (%) | | | 2.4 | 4.5 | 12.1 | | 1.9 |
| | Average Young's Modulus (MPa) | | | 1278.02 | 801 | 803.95 | | 961.71 |
| | Modulus Error (MPa) | | | 351.7 | 53.39 | 49.3 | | 33.8 |
| | Ultimate Tensile Stress (MPa) | | | 19.4 | 17.29 | 12.83 | | 16.98 |
| | Tensile Stress Error (MPa) | | | 1.01 | 0.77 | 1.24 | | 0.78 |

What is claimed is:

1. A sinterable polymer composition, comprising:
   a random copolymer of propylene and an olefinic comonomer, wherein the olefinic comonomer of the random copolymer is present in the random copolymer in an amount of from 2 to 10 wt %, relative to 100 wt % of the random copolymer,
   at least one of a clarifier and a nucleator, and
   at least one of a primary antioxidant, a secondary antioxidant, an acid scavenger, a peroxide, an enhanced IR energy absorber, a long-term heat agent, and a polyolefin elastomer,
   wherein the sinterable polymer composition has:
      a melt flow rate from 1 to 150 g/10 min (230° C./2.16 kg), measured according to ASTM D 1238,
      a crystallization temperature, Tc, from 105 to 150° C., and
      a xylene solubles content, XS, from 3% to 40%, measured according to ASTM D5492-17.

2. The sinterable polymer composition of claim 1, wherein the sinterable polymer composition has a melt flow rate from 5 to 100 g/10 min (230° C./2.16 kg), measured according to ASTM D 1238.

3. The sinterable polymer composition of claim 1, wherein the sinterable polymer composition has a crystallization temperature, Tc, from 105° C. to 125° C.

4. The sinterable polymer composition of claim 1, wherein the sinterable polymer composition has a crystallization temperature, Tc, from 112° C. to 122° C.

5. The sinterable polymer composition of claim 3, wherein the sinterable composition has a melting temperature, Tm, of from 125° C. to 175° C.

6. The sinterable polymer composition of claim 5, wherein the sinterable composition has a melting temperature, Tm, of from 135° C. to 155° C.

7. The sinterable polymer composition of claim 1, wherein the sinterable composition has a xylene solubles content, XS, from 3% to 10%, measured according to ASTM D5492-17.

8. The sinterable polymer composition of claim 1, wherein a weight-average molecular weight, Mw, of the random copolymer is from 100,000 g/mol to 500,000 g/mol, measured by GPC-IR.

9. The sinterable polymer composition of claim 1, wherein a number-average molecular weight, Mn, of the random copolymer is from 15,000 g/mol to 100,000 g/mol, measured by GPC-IR.

10. The sinterable polymer composition of claim 9, wherein a weight-average molecular weight, Mw, of the random copolymer is from 20,000 g/mol to 50,000 g/mol, measured by GPC-IR.

11. The sinterable polymer composition of claim 1, wherein the sinterable composition has a dispersity, measured by GPC-IR, of from 6 to 15.

12. The sinterable polymer composition of claim 1, wherein the sinterable composition, in printed form, has an average elongation-at-break of at least 8%, measured according to ASTM D 638.

13. The sinterable polymer composition of claim 12, wherein the sinterable composition, in printed form, has an average elongation-at-break of at least 12%, measured according to ASTM D 638.

14. The sinterable polymer composition of claim 1, wherein the random copolymer comprises singly-incorporated units of the olefinic comonomer in an amount of from 0.5 to 10 wt %, relative to 100 wt % of the random copolymer,
   wherein the random copolymer comprises doubly-incorporated units of the olefinic comonomer in an amount of from 0.01 to 10 mol %, relative to 100 mol % of the random copolymer, and/or
   wherein the random copolymer comprises triply-incorporated units of the olefinic comonomer in an amount of from 0.001 to 10 mol %, relative to 100 mol % of the random copolymer.

15. The sinterable polymer composition of claim 14,
   wherein the random copolymer comprises singly-incorporated units of the olefinic comonomer in an amount of from 1.5 to 5 wt %, relative to 100 wt % of the random copolymer,
   wherein the random copolymer comprises doubly-incorporated units of the olefinic comonomer in an amount of from 0.1 to 5 mol %, relative to 100 mol % of the random copolymer, and/or
   wherein the random copolymer comprises triply-incorporated units of the olefinic comonomer in an amount of from 0.005 to 3 mol %, relative to 100 mol % of the random copolymer.

16. The sinterable polymer composition of claim 14,
   wherein the random copolymer comprises singly-incorporated units of the olefinic comonomer in an amount of from 2.7 to 3.5 wt %, relative to 100 wt % of the random copolymer,
   wherein the random copolymer comprises doubly-incorporated units of the olefinic comonomer in an amount of from 0.5 to 0.9 mol %, relative to 100 mol % of the random copolymer, and/or
   wherein the random copolymer comprises triply-incorporated units of the olefinic comonomer in an amount of from 0.2 to 0.4 mol %, relative to 100 mol % of the random copolymer.

17. The sinterable polymer composition of claim 1, wherein the olefinic comonomer is ethylene or butene.

18. The sinterable polymer composition of claim 17, wherein the olefinic comonomer content comprises from 0.1 to 50 wt % of ethylene, from 0.1 to 50 wt % of butene, or from 0.1 to 50 wt % of ethylene and butene.

19. The sinterable polymer composition of claim 1, further comprising a polymer disperse phase, wherein the random copolymer is a matrix phase in which the polymer disperse phase is dispersed.

20. The sinterable polymer composition of claim 19, wherein the polymer disperse phase is an ethylene-containing polymer, and wherein the ethylene is present the polymer disperse phase in an amount of from 8 to 20 wt %, relative to 100 wt % of the polymer disperse phase.

21. The sinterable polymer composition of claim 1, wherein the sinterable polymer composition comprises one or more of the following:
   a primary antioxidant comprising one or more phenolic antioxidants,
   a secondary antioxidant comprising one or more phosphite antioxidants,
   an acid scavenger comprising one of more of calcium stearate, hydrotalcite, zinc stearate, PATIONIC 940, and PATIONIC 1240,
   a nucleator or clarifier comprising one or more of a sorbitol derivative, a dicarboxylate metal salt, a phosphate ester salt, and a trisamide,
   a peroxide comprising one or more of dialkyl-type peroxides and peroxyketal-type peroxides,
   a long-term heat agent comprising one or more thioester antioxidants, an enhanced IR energy absorber comprising one or more of carbon black, graphene, alumina, and calcium carbonate, and a polyolefin elastomer comprising one or more of an ethylene-butylene random copolymer, a propylene-butene random copolymer, an ethylene octane rubber, a styrene-butadiene copolymer, and an impact modifier.

22. The sinterable polymer composition of claim 1, further comprising a property-improvement filler.

23. The sinterable polymer composition of claim 22, wherein the property-improvement filler comprises at least one member selected from the group consisting of a flame retardant, glass fiber, glass spheres, and carbon fiber.

24. The sinterable polymer composition of claim 1, further comprising a laser-attractive ink.

25. The sinterable polymer composition of claim 1, further comprising a pigment.

26. A distribution of pellets, each pellet comprising the sinterable polymer composition of claim 1.

27. A powder, comprising the sinterable polymer composition of claim 1.

28. An article formed from the sinterable polymer composition of claim 1, by powder bed function based three-dimensional printing.

29. A method of additive manufacturing, the method comprising:
(1) depositing a layer of the sinterable polymer composition of claim 1 to a printing apparatus;
(2) irradiating the sinterable polymer composition of at a temperature range that sinters the sinterable polymer composition and causes at least a portion of the sinterable polymer composition to fuse and form a first printing layer;
(3) repeating steps (1) and (2) to form a second printing layer on the first printing layer; and
(4) optionally forming at least one or more further printing layer(s) on said second printing layer.

* * * * *